US009388963B2

(12) United States Patent
Dai et al.

(10) Patent No.: US 9,388,963 B2
(45) Date of Patent: Jul. 12, 2016

(54) OPTICAL LENS ASSEMBLY AND LIGHT SOURCE MODULE HAVING THE SAME

(71) Applicant: HON HAI PRECISION INDUSTRY CO., LTD., New Taipei (TW)

(72) Inventors: Feng-Yuen Dai, New Taipei (TW); Chau-Jin Hu, New Taipei (TW); Li-Ying Wang He, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 239 days.

(21) Appl. No.: 14/144,422

(22) Filed: Dec. 30, 2013

(65) Prior Publication Data
US 2015/0184832 A1    Jul. 2, 2015

(30) Foreign Application Priority Data
Dec. 27, 2013    (TW) .............................. 102148905 A

(51) Int. Cl.
| F21V 5/00 | (2015.01) |
| F21V 13/04 | (2006.01) |
| G02B 19/00 | (2006.01) |
| F21K 99/00 | (2016.01) |
| F21V 5/04 | (2006.01) |
| F21Y 101/02 | (2006.01) |

(52) U.S. Cl.
CPC ............ *F21V 13/04* (2013.01); *G02B 19/0028* (2013.01); *G02B 19/0061* (2013.01); *F21K 9/50* (2013.01); *F21V 5/008* (2013.01); *F21V 5/04* (2013.01); *F21Y 2101/02* (2013.01)

(58) Field of Classification Search
CPC ........... F21V 13/04; F21V 5/008; F21V 5/04; F21V 13/12; F21V 13/14; G02B 19/0028; G02B 19/0061; F21K 9/50; F21Y 2101/02
USPC ................. 362/311, 317, 326, 327, 328, 341, 362/296.01; 257/98, 100
See application file for complete search history.

(56) References Cited

U.S. PATENT DOCUMENTS

| 1,653,575 | A | * | 12/1927 | Kirtane | .................. | G02B 23/08 |
| | | | | | | 359/448 |
| 5,608,290 | A | * | 3/1997 | Hutchisson | .............. | B60Q 7/00 |
| | | | | | | 315/185 R |
| 8,814,392 | B1 | * | 8/2014 | Lipowsky | .............. | G02B 1/105 |
| | | | | | | 359/599 |

(Continued)

*Primary Examiner* — Anh Mai
*Assistant Examiner* — Glenn Zimmerman
(74) *Attorney, Agent, or Firm* — ScienBiziP, P.C.

(57) ABSTRACT

A light source module includes a light source and an optical lens assembly covering the light source. The optical lens assembly includes an optical lens, a reflecting member located on the optical lens, and a reflecting film formed on the reflecting member. The optical lens includes a main portion and a protruding portion protruding upwardly from the main portion. The reflecting member is conical. The reflecting member is invertedly located on the protruding portion of the optical lens. A tip of the reflecting member is inserted into an inside of the optical lens from the protruding portion. The reflecting member has a top surface and an outer circumferential surface. A center of the top surface of the reflecting member is recessed inwardly, whereby a concave surface is formed. The concave surface oriented upwardly and outwardly relative to the light source. The reflecting film is distributed on the concave surface.

18 Claims, 4 Drawing Sheets

(56) References Cited

U.S. PATENT DOCUMENTS

| | | | |
|---|---|---|---|
| 2006/0018122 A1* | 1/2006 | Negley | H01L 33/58 362/326 |
| 2006/0076568 A1* | 4/2006 | Keller | G02B 6/4214 257/98 |
| 2006/0171151 A1* | 8/2006 | Park | H01L 33/60 362/327 |
| 2007/0053203 A1* | 3/2007 | Graham | B60Q 7/00 362/559 |
| 2008/0144323 A1* | 6/2008 | Chang | F21V 5/046 362/310 |
| 2008/0252981 A1* | 10/2008 | Yasumoto | H04B 10/1121 359/599 |
| 2011/0069496 A1* | 3/2011 | Ing | B29D 11/00798 362/311.02 |

\* cited by examiner

OPTICAL LENS ASSEMBLY AND LIGHT SOURCE MODULE HAVING THE SAME

BACKGROUND

1. Technical Field

The disclosure generally relates to an optical lens assembly, and particularly relates to an optical lens assembly to increase an illuminating angle of a light source and a light source module having the optical lens assembly.

2. Description of Related Art

In recent years, due to excellent light quality and high luminous efficiency, light emitting diodes (LEDs) have increasingly been used as substitutes for incandescent bulbs, compact fluorescent lamps and fluorescent tubes as light sources of illumination devices.

Generally, light intensity of a light emitting diode gradually decreases from a middle portion to lateral sides thereof. Such a feature makes the LED unsuitable for functioning as a light source which needs a wide illumination, for example, a light source for a direct-type backlight module for a liquid crystal display (LCD). In some conditions, it is required to have an optical lens which can help the light emitted from a light emitting diode to have a wider illuminating angle and a special light distribution. Unfortunately, the conventional optical lens and a light source module having the conventional optical lens can not obtain a satisfactory effectiveness.

What is needed, therefore, is an improved optical lens assembly and a light source module having the optical lens assembly to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments of an optical lens and a light source module will now be described in detail below and with reference to the drawings.

Figure 1:
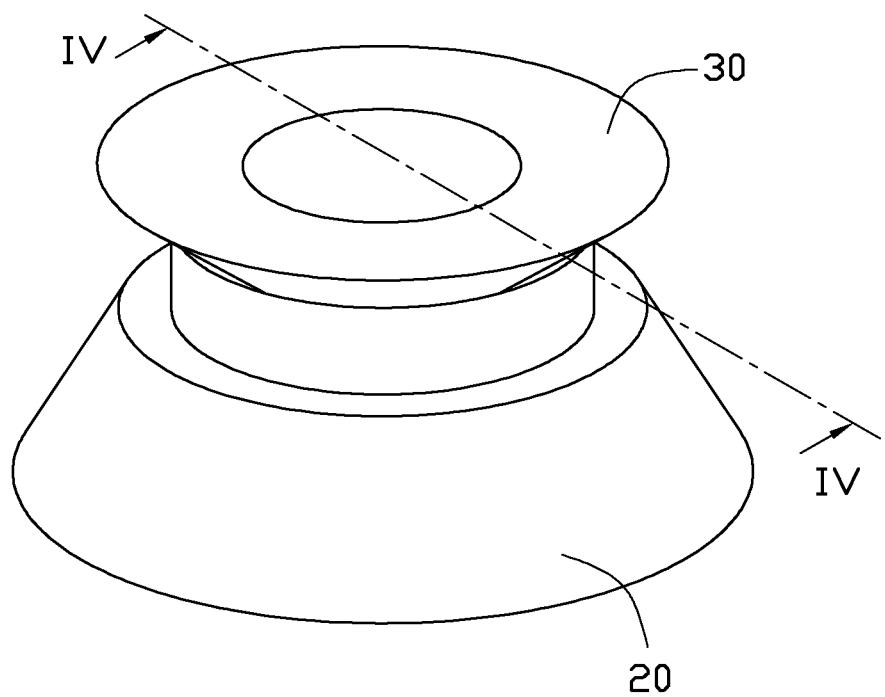
FIG. 1 is an isometric view of an optical lens assembly in accordance with an exemplary embodiment of the present disclosure.
Figure 2:
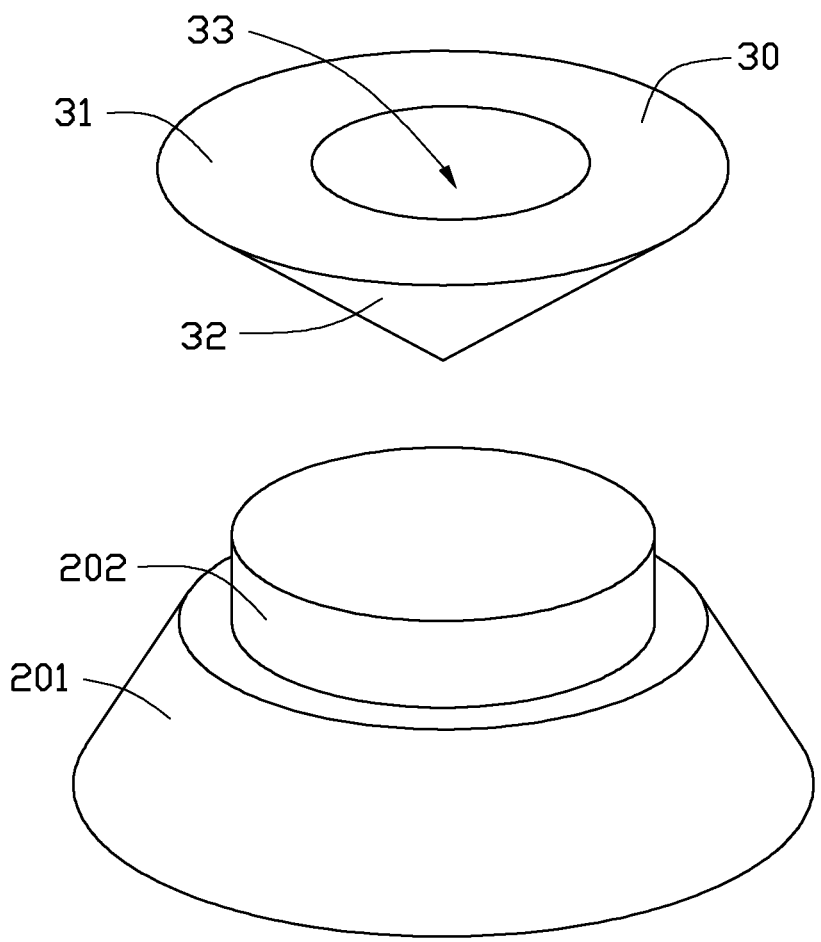
FIG. 2 is an exploded view of the optical lens assembly in FIG. 1.
Figure 3:
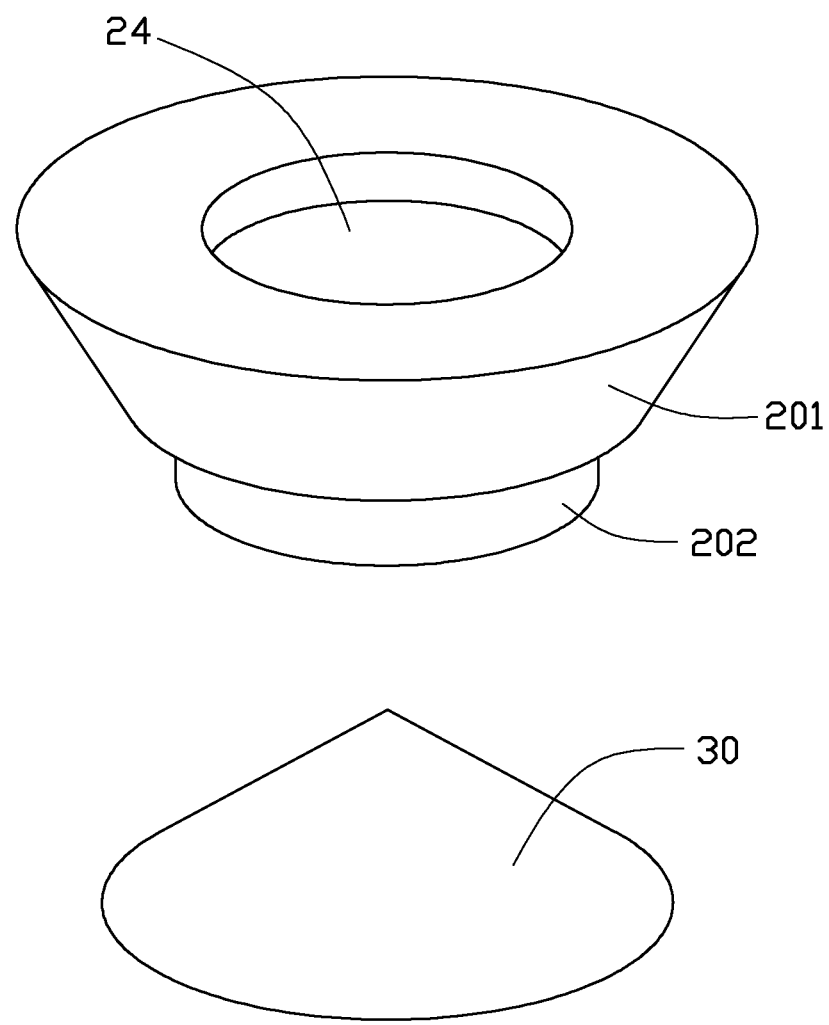
FIG. 3 is an inverted, exploded view of the optical lens assembly in FIG. 1.
Figure 4:
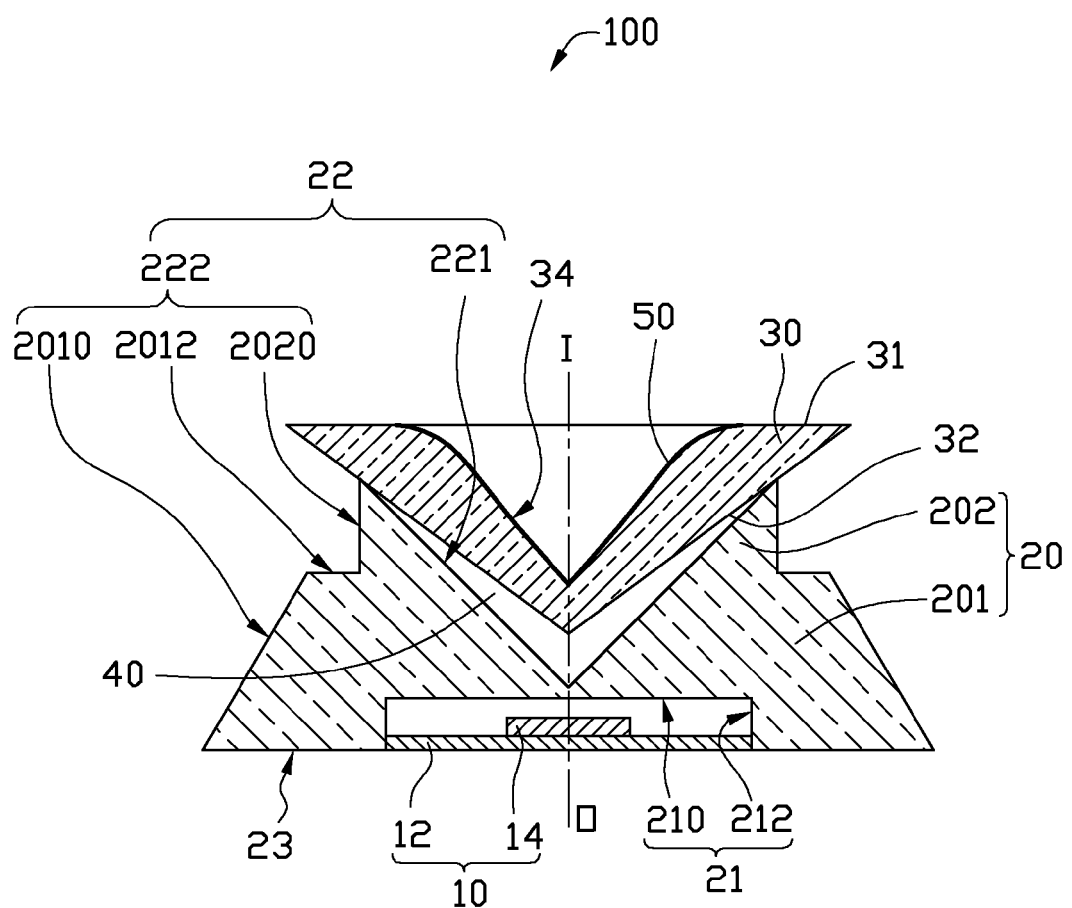
FIG. 4 is a cross section view of the optical lens assembly in FIG. 1, taken along a line IV-IV thereof, wherein a light source is positioned in the optical lens assembly.

Referring to FIGS. 1 through 4, a light source module 100 in accordance with an exemplary embodiment of the disclosure is illustrated. The light source module 100 includes a light source 10 and an optical lens assembly covering the light source 10. The light source assembly includes an optical lens 20 and a reflecting member 30 positioning on the optical lens 20.

The optical lens 20 includes a light incident face 21 facing the light source 10, a light emitting face 22 opposite to the light incident face 21, and a connecting face 23 connecting the light incident face 21 and the light emitting face 22. The light source 10 has an optical axis O, around which light emitted from the light source 10 concentrates in a surrounding space.

In this embodiment of the present disclosure, the light source 10 is a light emitting diode (LED), and includes a supporting base 12 and an LED chip 14 mounted on the supporting base 12. The supporting base 12 is flat. The supporting base 12 may be made of electrically-insulating materials such as epoxy, silicon or ceramic. The LED chip 14 may be made of semiconductor materials such as GaN, InGaN, AlInGaN or the like. Preferably, the LED chip 14 emits visible light when being activated.

The optical lens 20 is integrally made of transparent materials such as PC (polycarbonate), PMMA (polymethyl methacrylate) or optical glass. It could be understood, a plurality of fluorescence, such as YAG, TAG, silicate, nitride, nitrogen oxides, phosphide, arsenide, telluride or sulfide, could be further provided to mix in the optical lens 20.

The optical lens 20 is located above the light source 10. The optical lens 20 includes a main portion 201 and a protruding portion 202 protruding upwardly from a top of the main portion 201. The main portion 201 has a shape like a frustum. The main portion 201 is vertically located on the light source 10. A diameter of the main portion 201 gradually decreases along a bottom-to-top direction of the optical lens 20. The protruding portion 202 has a shape like a column. The protruding portion 202 is vertically located on the main portion 201. A center of a bottom face of the optical lens 20 is recessed inwardly, whereby the light incident face 21 and a receiving space 24 for accommodating the light source 10 are formed. The light incident face 21 includes a first light-incident facet 210 and a second light-incident facet 212. The first light-incident facet 210 is an inner face of the lens 20 which faces the light source 10 for the light emitted from the light source 10 with a small light-emergent angle passing through. The second light-incident facet 212 is another inner surface of the lens 20 surrounding the light source 10 for the light emitted from the light source 10 with a large light-emergent angle passing through. The first light-incident facet 210 is a planar face, and the second light-incident facet 212 is a cylindrical face. The connecting face 23 is an annular and planar face surrounding the light incident face 21. In use, the connecting face 23 is fitly attached on a supporting face (not shown) supporting the light source 10 and the optical lens 20.

The optical lens 20 defines a central axis I, and the optical lens 20 is axisymmetric relative to the central axis I. The main portion 201 of the optical lens 20 is axisymmetric relative to the central axis I. The protruding portion 202 of the optical lens 20 is axisymmetric relative to the central axis I. The central axis I of the optical lens 20 is aligned with the optical axis O of the light source 10. The light incident face 21 is axisymmetric relative to the central axis I. The light emitting face 22 is axisymmetric relative to the central axis I.

The light emitting face 22 includes a lateral face 222 extending upwardly from an outer periphery of the connecting face 23 and a top surface 221 of the protruding portion 202 located above the light incident face 21. The top surface 221 of the protruding portion 202 is recessed inwardly towards the light incident face 21. The top surface 221 of the protruding portion 202 is a conical face. A diameter of the top surface 221 of the protruding portion 202 gradually decreases along a top-to-bottom direction of the optical lens 20. The top surface 221 of the protruding portion 202 is axisymmetric relative to the central axis I. It could be understood that, the top surface 221 of the protruding portion 202 can also be columnar, ellipsoidal, spherical or paraboloidal.

The lateral face 222 of the light emitting face 22 is a discontinuous face and includes an outer circumferential surface 2010 of the main portion 201, a top surface 2012 of the main portion 201, and an outer circumferential surface 2020 of the protruding portion 202. The lateral face 222 is axisymmetric relative to the central axis I. The outer circumferential surface 2010 of the main portion 201 is conical. The top surface 2012 of the main portion 201 is an annular and planar face. The outer circumferential surface 2020 of the protruding portion 202 is columnar.

The reflecting member 30 is integrally made of transparent materials such as PC (polycarbonate), PMMA (polymethyl methacrylate) or optical glass. The reflecting member 30 has a shape like a cone. The reflecting member 30 has a circular top surface 31 and an outer circumferential surface 32. The outer circumferential surface 32 of the reflecting member 30 is conical. The reflecting member 30 is invertedly located on the protruding portion 202 of the optical lens 20. A tip of the reflecting member 30 is inserted into an inside of the optical lens 20 from the protruding portion 202. A top of the reflecting member 30 is stuck above the protruding portion 202 of the optical lens 20. The outer circumferential surface 32 faces the top surface 221 of the protruding portion 202. The outer circumferential surface 32 is spaced from the top surface 221 of the protruding portion 202, whereby an interval 40 is formed. The outer circumferential surface 32 of the reflecting member 30 is axisymmetric relative to the central axis I of the optical lens 20. A center of the top surface 31 of the reflecting member 30 is recessed inwardly, whereby a recessed space 33 and a concave surface 34 are formed. The concave surface 34 of the reflecting member 30 is axisymmetric relative to the central axis I of the optical lens 20. The concave surface 34 of the reflecting member 30 is a free-formed surface. It could be understood that, the concave surface 34 of the protruding portion 202 can also be conical, sculptured, columnar, ellipsoidal, spherical or paraboloidal.

The optical lens assembly further includes a light reflecting film 50 formed on the concave surface 34 of the reflecting member 30. The light reflecting film 50 is made of silver, aluminum, nanocomposites or other materials with high light-reflective capacity. The whole of the concave surface 34 of the light reflecting film 30 is coated by the light reflecting film 50.

Referring to FIGS. 1 through 4 again, in use, the light emitted from the light source 10 is entered into the optical lens 20 through the first light-incident facet 210 and the second light-incident facet 212 of the light incident face 21 and refracted, then transmitted in the optical lens 20, and exited and refracted from the top surface 221 of the protruding portion 202 and the lateral face 222 of the light emitting face 22, an then part of light is entered into the reflecting member 30, and exited from the outer circumferential surface 32 of the reflecting member 30. Light projects towards the light reflecting film 50 formed on the concave surface 34 of the reflecting member 30 is reflected laterally and upwardly, such that an illumination angle of the light source module 100 is widened and a satisfied light distribution of the light source module 100 is obtained.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical lens assembly for adjusting light emitted from a light source, comprising:
   an optical lens comprising a light incident face facing the light source, a light emitting face opposite to the light incident face, and a connecting face connecting the light incident face and the light emitting face;
   a reflecting member positioning on the optical lens; and
   a reflecting film formed on the reflecting member;
   wherein the optical lens comprises a main portion and a protruding portion protruding upwardly from a top of the main portion, the light emitting face comprises a lateral face extending upwardly from an outer periphery of the connecting face and a top surface of the protruding portion, and the top surface of the protruding portion is recessed inwardly towards and located above the light incident face;
   wherein the reflecting member is conical, the reflecting member is invertedly located on the protruding portion of the optical lens, a tip of the reflecting member is inserted into an inside of the optical lens from the protruding portion, the reflecting member has a top surface and an outer circumferential surface, the outer circumferential surface of the reflecting member faces the top surface of the protruding portion, a center of the top surface of the reflecting member is recessed inwardly, whereby a recessed space and a concave surface are formed, the concave surface oriented upwardly and outwardly relative to the light source, and the reflecting film is distributed on the concave surface; and
   wherein the lateral face of the light emitting face is a discontinuous face and comprises an outer circumferential surface of the main portion, a top surface of the main portion, and an outer circumferential surface of the protruding portion, the outer circumferential surface of the main portion is conical, an cross-section of the outer circumferential surface of the main portion is rake face, the top surface of the main portion is an annular and planar face.

2. The optical lens assembly as claimed in claim 1, wherein the top surface of the protruding portion is a conical face.

3. The optical lens assembly as claimed in claim 1, wherein the concave surface of the reflecting member is a free-formed surface.

4. The optical lens assembly as claimed in claim 1, wherein the main portion has a shape like a frustum, and a diameter of the main portion gradually decreases along a bottom-to-top direction of the optical lens.

5. The optical lens assembly as claimed in claim 1, wherein the optical lens defines a central axis, the optical lens is axisymmetric relative to the central axis, the main portion is axisymmetric relative to the central axis of the optical lens, and the protruding portion is axisymmetric relative to the central axis of the optical lens.

6. The optical lens assembly as claimed in claim 1, wherein a top of the reflecting member is stuck above the protruding portion of the optical lens, the outer circumferential surface of the reflecting member is spaced from the top surface of the protruding portion, whereby an interval is formed.

7. The optical lens assembly as claimed in claim 4, wherein the protruding portion has a shape like a column, and the protruding portion is vertically located on the main portion.

8. The optical lens assembly as claimed in claim 5, wherein the top surface of the protruding portion is axisymmetric relative to the central axis of the optical lens, the outer circumferential surface of the reflecting member is axisymmetric relative to the central axis of the optical lens, and the concave surface of the reflecting member is axisymmetric relative to the central axis of the optical lens.

9. The optical lens assembly as claimed in claim 5, wherein the light incident face is axisymmetric relative to the central axis, and the light emitting face is axisymmetric relative to the central axis.

10. A light source module, comprising:
a light source;
an optical lens assembly covering the light source, and the optical lens assembly comprising:
an optical lens comprising a light incident face facing the light source, a light emitting face opposite to the light incident face, and a connecting face connecting the light incident face and the light emitting face;
a reflecting member positioning on the optical lens; and
a reflecting film formed on the reflecting member;
wherein the optical lens comprises a main portion and a protruding portion protruding upwardly from a top of the main portion, the light emitting face comprises a lateral face extending upwardly from an outer periphery of the connecting face and a top surface of the protruding portion, and the top surface of the protruding portion is recessed inwardly towards and located above the light incident face;
wherein the reflecting member is conical, the reflecting member is invertedly located on the protruding portion of the optical lens, a tip of the reflecting member is inserted into an inside of the optical lens from the protruding portion, the reflecting member has a top surface and an outer circumferential surface, the outer circumferential surface of the reflecting member faces the top surface of the protruding portion, a center of the top surface of the reflecting member is recessed inwardly, whereby a recessed space and a concave surface are formed, the concave surface oriented upwardly and outwardly relative to the light source, and the reflecting film is distributed on the concave surface;
wherein the lateral face of the light emitting face is a discontinuous face and comprises an outer circumferential surface of the main portion, a top surface of the main portion, and an outer circumferential surface of the protruding portion, the outer circumferential surface of the main portion is conical, an cross-section of the outer circumferential surface of the main portion is rake face, the top surface of the main portion is an annular and planar face.

11. The light source module as claimed in claim 10, wherein the top surface of the protruding portion is a conical face.

12. The light source module as claimed in claim 10, wherein the concave surface of the reflecting member is a free-formed surface.

13. The light source module as claimed in claim 10, wherein the main portion has a shape like a frustum, and a diameter of the main portion gradually decreases along a bottom-to-top direction of the optical lens.

14. The light source module as claimed in claim 10, wherein the optical lens defines a central axis, the optical lens is axisymmetric relative to the central axis, the main portion is axisymmetric relative to the central axis of the optical lens, and the protruding portion is axisymmetric relative to the central axis of the optical lens.

15. The light source module as claimed in claim 10, wherein a top of the reflecting member is stuck above the protruding portion of the optical lens, the outer circumferential surface of the reflecting member is spaced from the top surface of the protruding portion, whereby an interval is formed.

16. The light source module as claimed in claim 13, wherein the protruding portion has a shape like a column, and the protruding portion is vertically located on the main portion.

17. The light source module as claimed in claim 14, wherein the top surface of the protruding portion is axisymmetric relative to the central axis of the optical lens, the outer circumferential surface of the reflecting member is axisymmetric relative to the central axis of the optical lens, and the concave surface of the reflecting member is axisymmetric relative to the central axis of the optical lens.

18. The light source module as claimed in claim 14, wherein the light incident face is axisymmetric relative to the central axis, and the light emitting face is axisymmetric relative to the central axis.

* * * * *